(12) United States Patent
Bhogal et al.

(10) Patent No.: US 7,376,717 B2
(45) Date of Patent: May 20, 2008

(54) METHOD AND APPARATUS FOR AUTOMATICALLY CONFIGURING A COMPUTER FOR DIFFERENT LOCAL AREA NETWORKS

(75) Inventors: Kulvir Singh Bhogal, Fort Worth, TX (US); Hung T. Dinh, Austin, TX (US); Teng S. Hu, Austin, TX (US); Mandeep S. Sidhu, Pflugerville, TX (US)

(73) Assignee: Lenovo (Singapore) Pte Ltd., Singapore (SG)

( * ) Notice: Subject to any disclaimer, the term of this patent is extended or adjusted under 35 U.S.C. 154(b) by 898 days.

(21) Appl. No.: 10/418,567

(22) Filed: Apr. 17, 2003

(65) Prior Publication Data

US 2004/0210649 A1    Oct. 21, 2004

(51) Int. Cl.
*G06F 15/177* (2006.01)
(52) U.S. Cl. ............... 709/220; 709/221; 709/227
(58) Field of Classification Search ........... 709/220, 709/221, 222, 224, 227; 713/1; 370/254; 455/456, 414
See application file for complete search history.

(56) References Cited

U.S. PATENT DOCUMENTS

| | | | | |
|---|---|---|---|---|
| 5,918,016 A | * | 6/1999 | Brewer et al. | 709/220 |
| 6,012,088 A | * | 1/2000 | Li et al. | 709/219 |
| 6,118,768 A | * | 9/2000 | Bhatia et al. | 370/254 |
| 6,493,751 B1 | * | 12/2002 | Tate et al. | 709/221 |
| 2001/0023445 A1 | | 9/2001 | Balogh | 709/229 |
| 2002/0101873 A1 | | 8/2002 | Perlman et al. | 370/400 |
| 2003/0027581 A1 | * | 2/2003 | Jokinen et al. | 455/456 |
| 2003/0167405 A1 | * | 9/2003 | Freund et al. | 713/201 |
| 2003/0212824 A1 | * | 11/2003 | Yoshizawa et al. | 709/245 |
| 2004/0064591 A1 | * | 4/2004 | Noble | 709/250 |

FOREIGN PATENT DOCUMENTS

EP    1271847 A2    1/2003

OTHER PUBLICATIONS

Droms, "Dynamic Host Configuration Protocol", Bucknell University, Oct. 1993, Abstract, pp. 1-39.

* cited by examiner

*Primary Examiner*—Frantz B. Jean
(74) *Attorney, Agent, or Firm*—Duke W. Yee; Charlie Bustamante; Lisa L. B. Yociss

(57) ABSTRACT

A method, computer program product, and data processing system for automatically configuring a networking-enabled device for use with different networks are disclosed. In a preferred embodiment, a client stores multiple configuration profiles containing configuration settings corresponding to different networks. When the client becomes connected to a network, a router or other form of server detects the addition of the client to the network. In response to the client connecting to the network, the server broadcasts an identifier over the network, which the client receives. The client uses the identifier to identify the appropriate stored configuration profile corresponding to the network. The client then completes its configuration using the identified configuration profile.

24 Claims, 5 Drawing Sheets

METHOD AND APPARATUS FOR AUTOMATICALLY CONFIGURING A COMPUTER FOR DIFFERENT LOCAL AREA NETWORKS

BACKGROUND OF THE INVENTION

1. Technical Field

The present invention is related generally to the configuration of a computer system for operation on a network. In particular, the present invention allows for automatic configuration of a computer for operation on different local area networks.

2. Description of Related Art

Modern telecommunications depends on networks. A network is a set of interconnected machines (network elements) that allow data to be relayed across the set of machines from a source to a destination. Networks may be classified according to the geographic area they occupy. A local area network (LAN) is usually defined as a network that is physically limited to a relatively small area, such as a building or group of buildings. A wide area network (WAN) is a general term for a network of larger size.

An internetwork, or internet, is a collection of networks interconnected by routers. Routers are network elements that relay (route) data between networks. Most WANs are internets composed of multiple interconnected LANs. Thus, the term WAN is often used to refer to an internet, while the term LAN is often used to denote a constituent network of an internet or WAN. In this document, the terms WAN and LAN are used in this "internetworking" sense, with the caveat that in a significant amount of computing and telecommunications literature the terms LAN and WAN is also used in the previously mentioned "geographical" sense.

The "worldwide Internet" or simply "Internet" (uppercase), which provides the backbone for the World Wide Web, is perhaps the best-known internet (lowercase), and the protocols and standards (e.g., the TCP/IP protocol suite, discussed below) that define the Internet also provide the basic model for most of current networking technology. Thus, in general, technical concepts that apply to the Internet generally find application in other networks and network technologies, as well.

Networking protocols, which define the rules for communication between network elements, are typically designed to work in layers, where each layer performs a slightly different role in data transmission. TCP/IP (Transmission Control Protocol/Internet Protocol) is a collection of protocols (called a protocol suite) that forms the basis for the Internet and many other networks. TCP/IP is generally considered to follow a four-layer protocol model.

The lowest layer of the TCP/IP protocol suite is referred to as the "Link Layer" and it represents the physical interface for supporting a connection to a physical network media, such as a cable or wireless link. The hardware that provides this interface is generally referred to as a "network adapter" (NA). In general, each NA will have a unique "hardware address" that distinguishes the NA from other NAs operating on the same physical network. Communications between network elements on the same physical network typically use these hardware addresses in order to address the communications to the correct NAs (and hence, the correct network elements, which employ those NAs).

The Network Layer, the next highest layer in the four-layer model, handles the movement of data packets around the network. Internet Protocol (IP) is the primary Network Layer protocol of the TCP/IP protocol suite. There are two main versions of IP currently in use, version 4 (IPv4), which is defined in RFC 791, and version 6 (IPv6), which is defined in RFC 1883). IP allows packets of data to be sent from a numerical source address in the network to a numerical destination address specified in the packet's header. Typically, these packets are "encapsulated" in the packets of whatever Link Layer protocol is involved. This means that the IP packets are carried as data payload within the packets generated by a Link Layer protocol.

These numerical addresses in the TCP/IP protocol suite are therefore generally referred to as "IP addresses," although the generic, non-IP-specific term is "network addresses." Network addresses are different from hardware addresses, because network addresses are used to identify a network element over an entire WAN, rather than to identify an NA among NAs on the same LAN. Another name for a hardware address is a "MAC address." MAC stands for "Media Access Control" and refers to the fact that the MAC address is associated with the hardware that controls access to the physical network medium.

In IP and other Network Layer protocols, special destination IP addresses are defined to allow broadcasting of packets over one or more LANs. When a packet is broadcast over a LAN, all network elements in the LAN receive the packet. For example, in IP, when a packet that is addressed to IP address "255.255.255.255" is sent over a LAN, the packet will be received by all network elements on that LAN. To distinguish from broadcasting, the process of sending a packet to a single destination network address is called "unicasting."

Internet Control Message Protocol version 4 (ICMPv4) (RFC 792) is another Network Layer protocol that is used in conjunction with IPv4 for sending control and error messages. A new version of the protocol, ICMPv6 (RFC 1885), is used in conjunction with IPv6.

The next level up in the four-layer model is the Transport Layer, which is concerned with how packets are sent and received at a single host. TCP/IP uses two main Transport Layer protocols, Transmission Control Protocol (TCP) (RFC 793) and User Datagram Protocol (UDP) (RFC 768), which provide additional functionality on top of IP.

The top layer, the Application Layer, represents the functionality for supporting a particular network application. There are many Application Layer protocols for supporting network applications, such as electronic mail.

Additional protocols within the TCP/IP protocol suite provide mechanisms for dynamic configuration of network elements when new network elements are added to a network. Some of these are discussed below.

Reverse Address Resolution Protocol (RARP) (RFC 903), allows a network element that is newly added to the network to obtain its assigned network address. The network element broadcasts a request packet containing the network element's hardware address. Another network element, typically a router, unicasts a reply packet to the requesting network element to provide the requesting network element with its assigned IP address. RARP can be used by diskless "network computers" or graphical terminals, which contain no facility for permanently storing a network address, to obtain a network address. RARP can also be used to dynamically assign network addresses from a set of network addresses to hosts that enter a network.

Bootstrap Protocol (BOOTP) (RFC 951) and Dynamic Host Configuration Protocol (DHCP) (RFC 1541), an enhanced variant of BOOTP, are two additional protocols that, like RARP, may be used by a host to obtain its IP address. These protocols are more versatile than RARP, because BOOTP and DHCP allow a host to obtain additional configuration information besides a network address, such as the location of a boot image. A request in either of these two protocols is made by broadcasting a request packet over the requesting network element's LAN. A BOOTP or DHCP "server" receives the request and sends back a reply.

BOOTP was designed to be extendable to allow additional information and features to be added to the protocol. DHCP is a protocol that is interoperable with BOOTP, but which allows a larger amount and variety of configuration data to be obtained by a requesting host. Also, DHCP allows a host to submit an identifier in its request, to allow the DHCP server to return configuration information specific to the particular host.

The dynamic configuration protocols just discussed were designed to allow a diskless "network computer" or terminal to boot an operating system or other code from a network without the need for a boot disk. These protocols may also be used in network elements that are only temporarily connected to a network, in order to allow a network address to be temporarily assigned to the network element and for additional configuration information to be transmitted to the network element.

These dynamic configuration protocols, however, suffer from a number of security weaknesses, because they are designed to freely distribute network configuration information in an unprotected form. For example, these protocols do not prevent a malicious user from setting up an unauthorized protocol server (such as a DHCP server) and then send false or potentially disruptive information to clients that can be used to compromise affected systems. Likewise, these protocols do not prevent unauthorized clients to obtain network information or tie up network resources.

RFC 1541, which defines DHCP, suggests that at least one reason current dynamic configuration protocols are insecure is that they were designed to work with diskless hosts, and the task of configuring diskless hosts to support authentication is prohibitively difficult and inconvenient. As mobile and wireless networking become more prevalent, however, both the need for dynamic configuration and the need for information security increase, since mobile and wireless devices (including those of malicious users) can readily move from one network to another. Thus there is a need for a secure way of automatically configuring a computing device for use with multiple networks.

SUMMARY OF THE INVENTION

The present invention provides a method, computer program product, and data processing system for automatically configuring a networking-enabled device for use with different networks, including local area networks (LANs), in particular. In a preferred embodiment, a client stores multiple configuration profiles containing configuration settings corresponding to different networks. When the client becomes connected to a network, a router or other form of server detects the addition of the client to the network. In response to the client connecting to the network, the server broadcasts an identifier over the network, which the client receives. The client uses the identifier to identify the appropriate stored configuration profile corresponding to the network. The client then completes its configuration using the identified configuration profile.

The present invention is an improvement over prior art approaches to network configuration in that it allows a client to configure itself for use on multiple networks, but without exchanging actual configuration information over the network. This prevents the sorts of security issues that can arise in using existing dynamic configuration protocols such as DHCP, because those security issues result from transmitting sensitive configuration information over the network.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
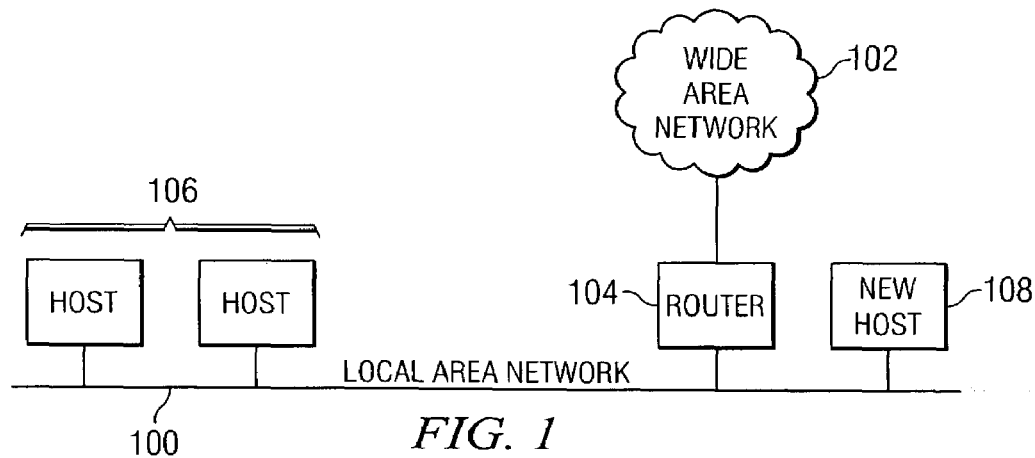
FIG. 1 is a diagram of a network in which a preferred embodiment of the present invention may be implemented.

FIG. 1 is a diagram of an exemplary network in which a preferred embodiment of the present invention may be implemented. A local area network (LAN) is a constituent network making up a portion of a wide area network (WAN) 102. LAN 100 is connected to the remainder WAN 102 through a router 104. In an actual embodiment, router 104 may be one of several routers connecting LAN 100 to WAN 102. LAN 100 is depicted in FIG. 1 as a horizontal line, which resembles a wire. This is because many LANs, such as an Ethernet, use a cable as a physical transport medium to connect network elements in the network in a bus-like fashion. FIG. 1 should not be interpreted to imply that a bus-like cable-connected network can or should be the only type of network used in an embodiment of the present invention. To the contrary, any of a number of different physical transport media or topologies may be employed, without limitation. For example, with respect to physically-connected networks, star-shaped or ring-shaped topologies or any other form of network topology may be used without department from the scope and spirit of the present invention. Further, different transport media may be employed, as are known in the art. For example, LAN 100 may be an optical network or wireless network, such as a wireless ad-hoc network following IEEE Standard 802.11. In short, the teachings of the present invention are intended for general application and are not limited to any particular type of network technology.

Returning to FIG. 1, LAN 100 interconnected a number of hosts 106. Each of hosts 106 is configured to operate within LAN 100 according to configuration settings that define appropriate operation of hosts 106 within LAN 100. These configuration settings may include, but are not limited to, communication parameters that define how communications over the network take place, policies defining a scope of permitted or preferred activity over the network, information regarding the existence and availability of resources within the network, and security, authentication, or cryptographic information for permitting secure network communication and restricted access to network resources.

In FIG. 1, new host 108 has just become connected to LAN 100. New host 108 may be, for instance, a mobile computing device, such as a notebook computer or PDA, a wireless device, such as a computing device equipped with an adapter for wireless ad-hoc networking, or any other form of computing device or telecommunication device that may be connected or disconnected from a network. One of ordinary skill in the art will recognize that the teachings of the present invention are not limited to any particular form of computing or telecommunications hardware technology. The present invention is directed toward the problem of allowing a network element, such as newly connected host 108, to automatically apply appropriate configuration settings for the particular network the network element is connected to.

It should be noted that throughout this document, the term "network element" is used to refer to any device that can be connected to a network. Thus, hosts 106, router 104, and new hosts 108 are all "network elements," at least as the term is used in this document. Further, by "connected to a network," it is meant that a network element is able to send or receive data in the network in some form. What is required in order to send data in a network and the ability to receive data in a network are dependent on the particular type of networking technology being used. For example, in an Ethernet, which is a physically connected network, a network element must be physically connected to the network through a cable in order to send or receive data. In a wireless ad-hoc network, on the other hand, a network element must be within the signal reception range for the wireless network, and in some cases, a network element in a wireless ad-hoc network must be "discovered" by one or more other network elements in the wireless ad-hoc network in order to send data or to receive data in the network.

The terms "server" and "client" are also used repeatedly within this document. It should be noted that, at least as the terms are used in this document, the words client and server refer to a relationship between particular entities in a network. Specifically, a server is an entity that provides one or more services to a client. The terms client and server may be used to refer to hardware or software or a combination of both. One of ordinary skill in the art will recognize that in the context of discussing network communications between different network elements in a network, the use of the terms client and server tends to blur the distinction between hardware and software, because a typical client-server interaction in a network is an interaction of two distinct software processes residing on two distinct network elements.

In this document, the terms client and server are used both to refer to software processes in a client-server relationship and to refer to the hardware that such software processes reside on. This usage is consistent with current usage in the computing arts. In many cases, it is not necessary to make a distinction between client hardware and client software or between server hardware and server software, because it is the client-server relationship itself that is of consequence to the discussion. In this document, whenever a distinction between hardware and software must be made, it will be specifically noted. For example, FIGS. 2 and 3 refer to server hardware and client hardware, respectively.

In a preferred embodiment of the present invention, the role of client is played by a network element that is newly connected to a network, such as new host 108 in FIG. 1. The role of server is played by another network element that is connected to the network, such as one of hosts 106 or router 104 in FIG. 1. This results from the fact that in a preferred embodiment of the present invention, a newly added network element, the client, relies on services (i.e., transmission of an identifier) provided by a server to identify the network to which the client is connected.

In a preferred embodiment, the server is a router, such as router 104. A router is a good choice of network element to play the part of a server, because routers are generally permanently connected to the networks they interconnect, and routers generally have a dedicated administrative role within the network, which makes them good candidates for performing an administrative role, such as assisting a network element with configuration, as in the present invention. We now turn to FIGS. 2 and 3, which describe hardware platforms that may be utilized as a server and client, respectively.

Figure 2:
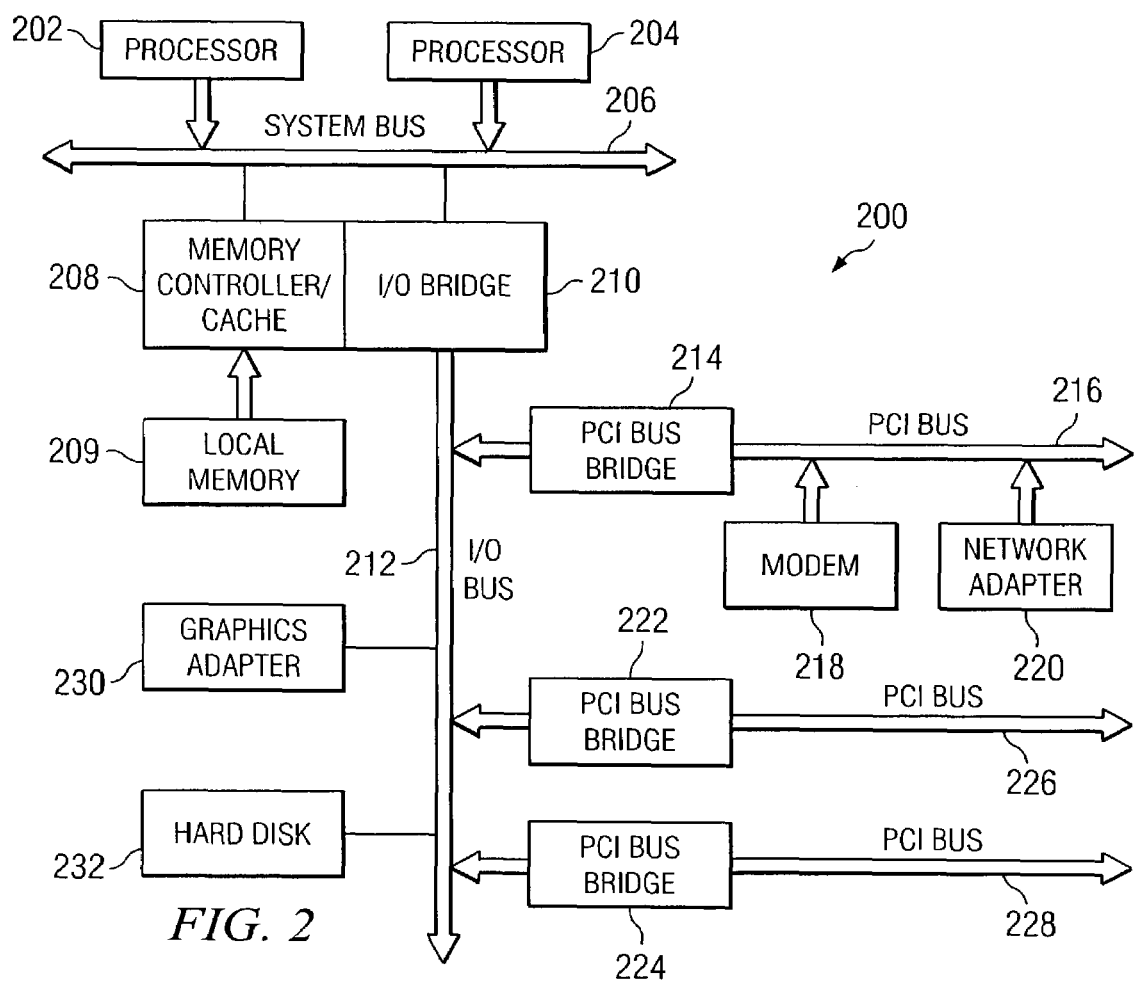
FIG. 2 is a block diagram of an example data processing system that may be used as a server in accordance with a preferred embodiment of the present invention.

Referring to FIG. 2, a block diagram of a data processing system that may be implemented as a server, such as router 104 or one of hosts 106 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. Typical PCI bus implementations will support multiple PCI expansion slots or add-in connectors. Communications links to other network elements are provided through network adapter 220. Network adapter 220 may provide an interface to any of a number of types of networks, including cable-based networks, optical networks, wireless networks, and the like. As stated previously, the teachings of the present invention are not dependent upon the use of any particular form of network medium or topology. A modem 218 may also be used to provide a point-to-point link to another network element over a telephone connection. Network adapter 220 and modem 218 are connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network elements, including routers and hosts. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be a general purpose data processing system such as, for example, an IBM eServer pSeries system, a product of International Business Machines Corporation in Armonk, N.Y., running the Advanced Interactive Executive (AIX) operating system or LINUX operating system. Alternatively, the data processing system depicted in FIG. 2 may be a special-purpose data processing system, such as a Cisco 12000 Series router, which is a product of Cisco Systems, Inc. in San Jose, Calif.

Figure 3:
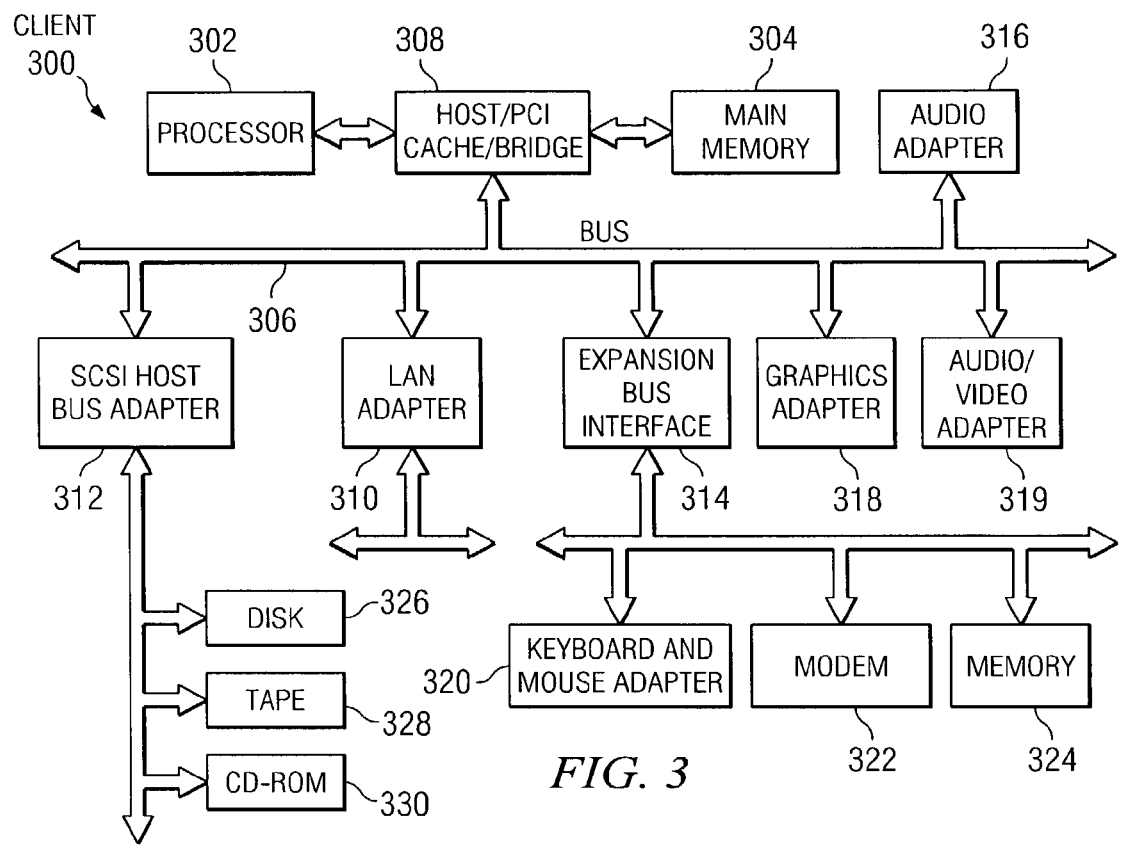
FIG. 3 is a block diagram of an example data processing system that may be used as a client in accordance with a preferred embodiment of the present invention.

With reference now to FIG. 3, a block diagram illustrating an exemplary data processing system that may be used as a client in a preferred embodiment of the present invention. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

In particular, LAN adapter 310 may provide an interface to any of a number of different types of networks. For example, LAN adapter 310 may provide an interface to a traditional cable-connected network, such as an Ethernet. Alternatively, LAN adapter 310 may provide for communications over a wireless network, an optical network, or any other network medium.

An operating system runs on processor 302 and is used to coordinate and provide control of various components within data processing system 300 in FIG. 3. The operating system may be a commercially available operating system, such as Windows XP, which is available from Microsoft Corporation. User processes, including application programs, are executed under the supervision of the operating system and may issue calls to the operating system to utilize services of the operating system, such as input/output services, process management services, interprocess communication (IPC) services, and services for providing communications with other network elements in a network. Instructions for the operating system, application programs, and other software are located on storage devices, such as hard disk drive 326, and may be loaded into main memory 304 for execution by processor 302. Preferably, data processing system 300 is a stand-alone system configured to be bootable independent of a network, although the ability to boot without assistance from a network is not a requirement of the present invention.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. In addition, data processing system 300 may take many forms. Data processing system 300 may be a desktop computer or an even larger scale computer, such as a minicomputer or mainframe. Data processing system could also be a smaller-scale computer system. For example, data processing system 300 may be a personal digital assistant (PDA) device and configured with ROM and/or flash ROM in order to provide non-volatile memory for storing operating system files and/or user-generated data. Data processing system 300 could also be a notebook computer or a handheld computer. Data processing system 300 also may be a kiosk or a Web appliance. Data processing system 300 could also be an embedded data processing system within some other type of device, such as an item of telecommunications or telephone equipment (a mobile telephone, for example).

The present invention is directed toward a method, computer program product, and data processing system for automatically configuring a client network element for operation with multiple networks. In a preferred embodiment of the present invention, a client stores a plurality of sets of configuration settings, in which each set of configuration settings corresponds to a different network to which a client may connect. A "set" is an aggregation of zero or more items. A unique network identifier is assigned to each network (e.g., by the network's administrator). On the client, the set of configuration settings corresponding to a particular network are stored in a way that associates the set of configuration settings with the network identifier for that network.

When the client connects to a network, a server on the network broadcasts the network identifier corresponding to that network. The client, upon receiving the network identifier from the server, configures itself using the set of configuration settings corresponding to the network identifier. In a preferred embodiment, the server broadcasts the network identifier over the network in response to detecting that the client has joined the network.

In general, a server will be able to determine that a new host has joined the network. In some networks, a newly-added network element is discovered by other network elements on the network as a part of the connection process. For example, in a wireless ad-hoc network, the process of incorporating a new network element into the wireless network may include discovery of that network element by other network elements in the network. In other networks, the presence of an additional network element can be detected by monitoring for network traffic.

Since each network adapter typically has a unique hardware address, a server that is configured to read the Link Layer protocol (e.g., Ethernet, Token Ring, etc.) for the network can identify the presence of a new network element in the network by detecting network traffic in which a new hardware address can be read from packets or messages in the Link Layer protocol. This situation is depicted in FIG. 4.

Figure 4:
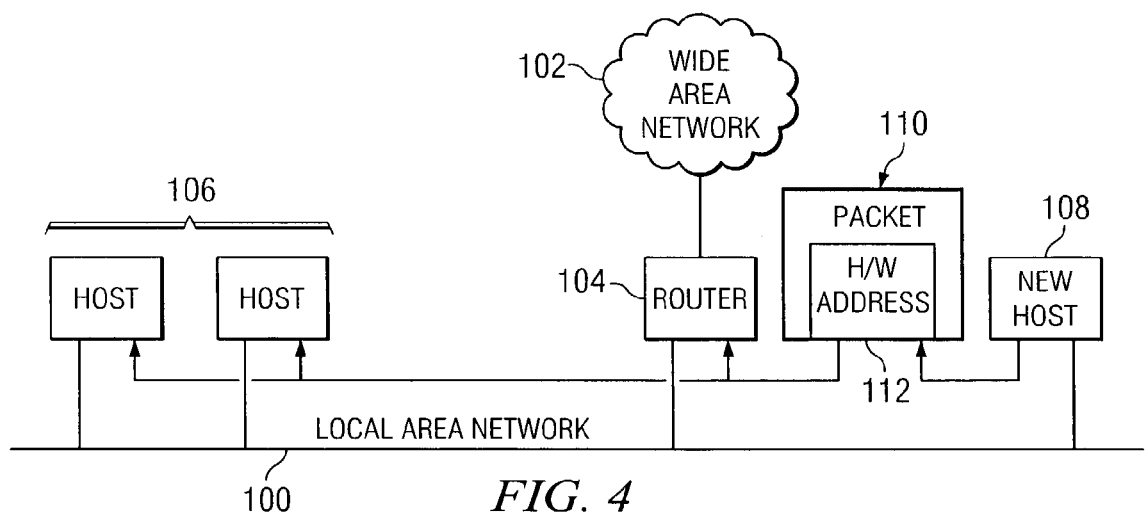
FIG. 4 is a diagram of a newly-added host broadcasting a packet that may be used to detect the presence of the newly added host in accordance with a preferred embodiment of the present invention.

In FIG. 4, new host 108 broadcasts a packet 110 over local area network (LAN) 100. Packet 110, like all packets transmitted over local area network 100, includes a hardware address 112, which is supplied by the Link Layer protocol, as implemented on new host 108. Since it is a standard practice in the art to assign a globally unique hardware address to every network adapter that is manufactured, new host 108 will be clearly distinguishable from hosts 106, which already reside on LAN 100.

Router 104, in this example, is the server. In this preferred embodiment, router 104 will keep track of hardware addresses that router 104 observes in network traffic over LAN 100. Preferably, router 104 will maintain a dynamic table of hardware addresses of network elements that have recently transmitted over LAN 100. Router 104 can then detect that new host 108 or any other new network element has been added to the network by consulting the table to determine if a packet has been sent over LAN 100 in which the hardware address representing the sender of the packet is not contained within the table.

In the embodiment depicted in FIG. 4, new host 108 may make its presence known on LAN 100 by sending packet 110, which contains hardware address 112, the hardware address of new host 108. Packet 110 may be a packet according to an existing protocol standard. For example, in the situation in which LAN 100 is a network that utilizes the TCP/IP protocol suite, packet 110 could be an IP packet (that is, a packet in Internet Protocol), in which the source IP address is given as "0.0.0.0," which represents that the source of packet 110 is not aware of its own IP address.

As a further example, packet 110 could be a message in ICMP (Internet Control Message Protocol), such as an echo request or router solicitation. An echo request is a request for the recipient of the echo request to return an echo reply message in ICMP. Echo requests and echo replies are used by the well-known network application program "ping." A router solicitation message is an ICMP query that directs routers on the network to identify themselves.

One of ordinary skill in the art will recognize, however, that if router 104 is configured to monitor for the hardware addresses transmitted by the Link Layer protocol, then new host 108 will be detectable by router 104 by transmitting any kind of data over LAN 100, without regard for any network layer, Transport Layer, or Application Layer protocols that new host 108 may use to transmit that data. This is because hardware address 112 is transmitted by the Link Layer protocol used on LAN 100.

In an alternative embodiment, router 104 may be configured to detect the presence or at least to assume the presence of a newly-added network element by examining network traffic over LAN 100 at a higher protocol layer then the Link Layer. For example, the aforementioned router solicitation query, provided in ICMP, is a message in a Network Layer protocol from which it can be safely assumed that the sender of the router solicitation query is a newly-added network element, or at the very least, a network element in need of information concerning the network. This is because it is customary for a host that utilizes the TCP/IP protocol suite, upon first joining the network, to transmit three router solicitations, three seconds apart. Typically, once the host receives a valid router advertisement, the host stops sending router solicitations. This mechanism is typically employed to allow a newly-added host to automatically find at least one router in the network.

In yet another alternative embodiment of the present invention, packet 110 may be transmitted to specifically inform a server, such as router 104, that new host 108 has joined LAN 100 or that the network identifier for LAN 100 is needed by new host 108. This can be accomplished by providing a specific code or designation that can be incorporated into messages in an existing protocol standard (e.g., in an unused data field). One of ordinary skill in the art will also recognize that this technique may be employed with any of a number of standard protocols operating at any of the Link Layer, network layer, Transport Layer, Application Layer, and any other protocol layer that may be defined for the particular type of network being employed.

Alternatively, a special-purpose message format or protocol may be defined for use in an embodiment of the present invention, so that new host 108 can announce its presence to router 104 by broadcasting a packet or message in this special-purpose format for protocol.

Figure 5:
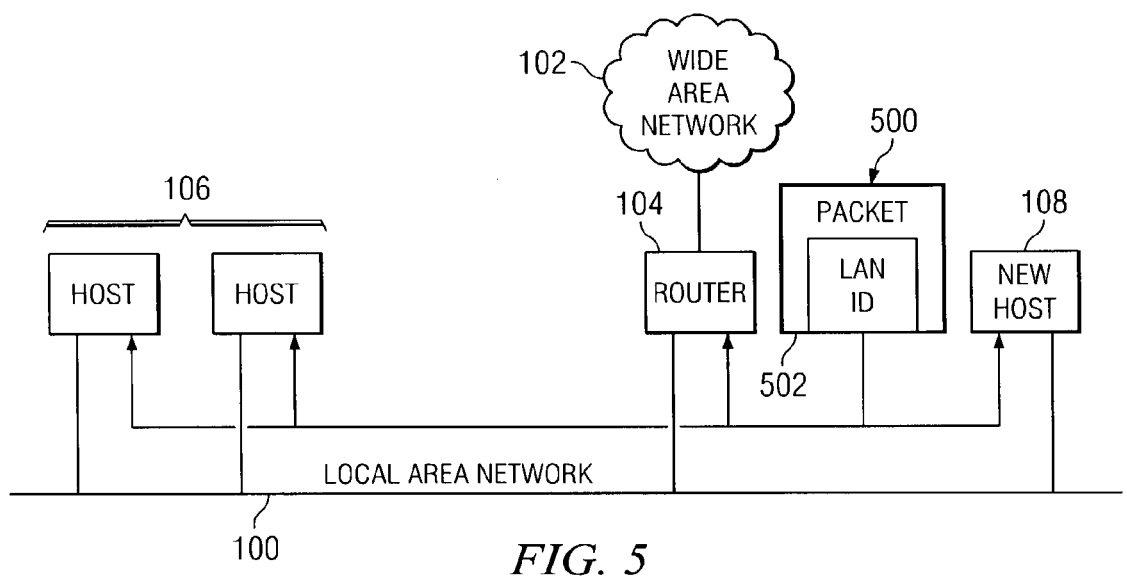
FIG. 5 is a diagram of a server broadcasting a network identifier in accordance with a preferred embodiment of the present invention.

In a preferred embodiment, once the server has determined or at least can presume that a network element has been newly added to the network, the server broadcasts an identifier that identifies the particular network the server resides on. FIG. 5 continues the example of FIG. 4 by showing that router 104 broadcasts a packet 500 over LAN 100 in response to determining that new host 108 has connected to LAN 100. Packet 500 contains a LAN ID 502, which is an identifier that identifies LAN 100. In the generic terminology used up until this point, LAN ID 502 is the network identifier for LAN 100.

In a preferred embodiment, LAN ID 502 will be assigned by a human administrator and stored in router 104 in flash ROM or some other form of non-volatile storage. It is contemplated that a registration organization may be employed to assign network identifiers to networks so as to ensure that each assigned identifier is globally unique, in a similar fashion to the way network adapters are given globally unique hardware addresses.

Since, in this preferred embodiment, router 104 broadcasts packet 500 over LAN 100, all network elements on LAN 100, including hosts 106 and new hosts 108, receive packet 500 containing LAN ID 502. In this way, router 104 need not be configured to determine the hardware address of any newly-added network elements. This is a particularly useful feature in an embodiment in which the server that broadcasts the network identifier is made up of a software process residing on a general-purpose data processing system, rather than on a special-purpose data processing system, such as a router. In some cases, depending on the programming platform and system software platform on which the server software is based, it may be more difficult for the server software to determine the hardware address of a newly-added host in order to unicast a response. This is particularly true when the server hardware is a general-purpose data processing system and the server software is a user process, rather than a part of the operating system.

Alternatively, if router 104 can ascertain an address, such as a hardware address, for new host 108, router 104 can simply unicast packet 500 to new host 108. In yet another alternative embodiment, router 104 can periodically broadcast a packet containing LAN ID 502 (such as packet 500 in FIG. 5) to all network elements on LAN 100 without having to detect the presence of a newly-added network element. A variation on this approach is to periodically broadcast packets containing LAN ID 502 without regard for whether any network elements have been newly added to LAN 100, but also transmit LAN ID 502 in response to a determination that a network element has been or is likely to have been newly added to LAN 100.

Once host 108 receives LAN ID 502, the host 108 uses the received LAN ID 502 to identify an appropriate set of configuration settings corresponding to the network. Host 108 then applies this set of configuration settings in order to configure itself for proper operation on the network.

Figure 7:
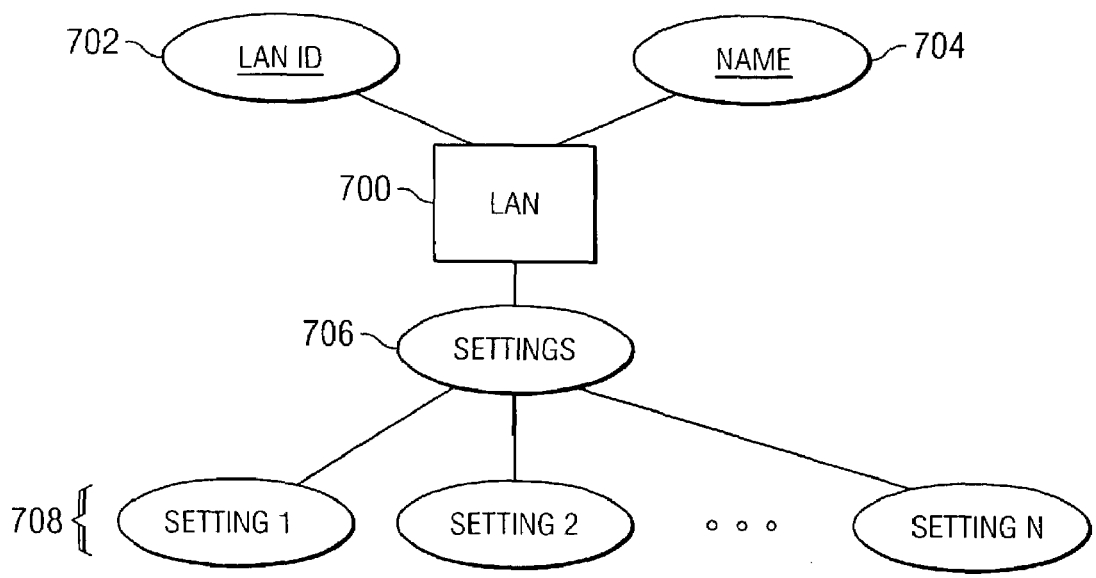
FIG. 7 is an E-R diagram of an example schema for organizing configuration information stored by a client in accordance with a preferred embodiment.

FIG. 7 is an entity-relationship (E-R) diagram that describes a schema that may be used in a preferred embodiment of the present invention to organize configuration data to allow a newly-added network element (such as host 108) to identify and apply a correct set of configuration settings for the network that the network element has become connected to, as determined by the network identifier (e.g., LAN ID 502) received from the server (e.g., router 104). A "schema," as the term is used here, means a description of a way in which a collection of data is organized or represented.

Figure 6:
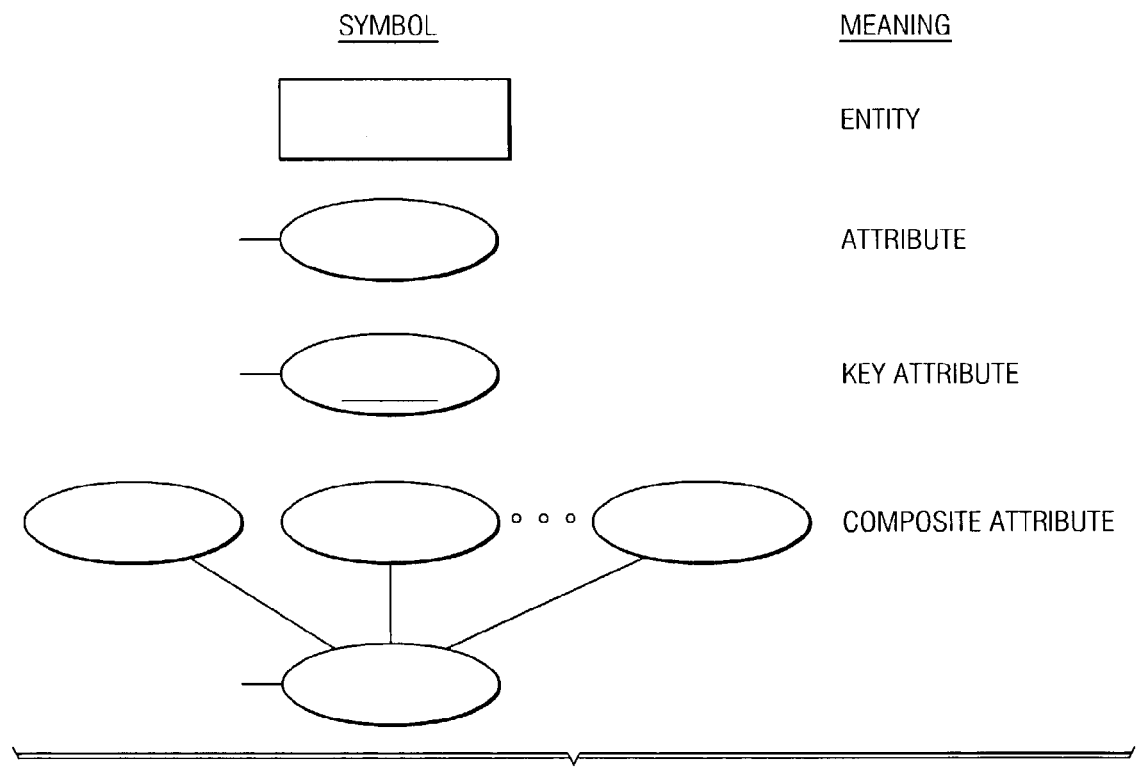
FIG. 6 is an explanatory diagram defining symbols used in entity-relationship (E-R) modeling of data.

Although E-R diagrams are well known in the computing art, FIG. 6 and the text that immediately follows are provided here as background information for use in interpreting FIG. 7. One of ordinary skill in the art will also recognize that the particular symbols used in E-R diagramming are sometimes varied within the literature, so FIG. 6 also serves to provide a key that may be helpful to readers who are familiar with entity-relationship diagramming to determine which symbols have been adopted for use in this document.

The E-R (entity-relationship) approach to data modeling provides a semantics for the conceptual design of structured data (e.g., databases, data structures, files, etc.). With the E-R approach, the information to be organized is represented in terms of entities, attributes of entities, and relationships between entities, where the following definitions apply. The modeling semantics corresponding to each definition is illustrated in FIG. 6. FIG. 6 is adapted from Elmasri and Navathe, *Fundamentals of Database Systems,* 3rd Ed., Addison Wesley (2000), pp. 41-66, which contains additional material regarding E-R diagrams and is hereby incorporated by reference.

Entity: An entity is a principal object about which information is collected. For example, in a database containing information about personnel of a company, an entity might be "Employee." In E-R modeling, an entity is represented with a box.

Attribute: An attribute is a label that gives a descriptive property to an entity (e.g., name, color, etc.). Two types of attributes exist. Key attributes distinguish among occurrences of an entity. For example, in the United States, a Social Security number is a key attribute that distinguishes between individuals. Descriptor attributes merely describe an entity occurrence (e.g., gender, weight). As shown in FIG. 6, in E-R modeling, an attribute is represented with an oval tied to the entity (box) to which it pertains. In some cases, a composite attribute may be formed from multiple grouped attributes. A composite attribute is represented by a tree structure, as shown in FIG. 6.

FIG. 7 is an entity-relationship (E-R) diagram providing an example schema for the organization of configuration information in a client in accordance with the preferred embodiment of the present invention. A single entity, LAN entity 700, represents a single network to which the client may connect. LAN ID attribute 702 represents the network identifier for a given network. LAN ID attribute 702 is a key attribute of LAN entity 700, because in a preferred embodiment, a network is uniquely identified its network identifier. A network identifier, according to a preferred embodiment may be a number, code, symbol, string, or any other data that can be used to identify a network.

An additional key attribute, such as name key attribute 704, may be included along with LAN ID key attribute 702, in order to provide an additional means for uniquely identifying a particular network. In this example, name key attribute 704 allows a user to assign a convenient name to a particular network, so that that user may refer to the network by its name without having to remember the network identifier for that network.

A third attribute, settings attribute 706, is a composite attribute representing the individual configuration settings associated with the network represented by LAN entity 700. Settings attribute 706 is shown here as a composite attribute, because a given network may require multiple configuration settings of different kinds, represented by individual setting attributes 708, which branch off of settings attribute 706. For example, the configuration settings for a particular network may include a network address, addresses of particular services in the network such as mail servers or DNS (Domain Name Service) servers, authentication of security information, and any other information used to configure a client for operation on a given network.

It should be noted that the skill of translating the E-R diagram in FIG. 7 into an appropriate implementation in a data processing system, such as a database, data structure, file, or combination thereof, is well known to those of ordinary skill in the art. It should also be noted that a wide variety of forms and techniques for representing schema-organized data exist in the art. The schema in FIG. 7, for example, could be implemented as an indexed file or an indexed data structure of records, where each record represents a single network. Preferably, such a file or data structure will be indexed by LAN ID key attribute 702.

Because many such forms of data representation are well-known in the art, no further discussions of the actual implementation of data storage according to a schema, such as is shown in FIG. 7, will be made. It should be pointed out, however, that the schema depicted in FIG. 7 is itself intended to be only an example. Many other possible schemas for associating a set of configuration settings to a network identifier may be utilized without departing from the scope and spirit of the present invention.

Figure 8:
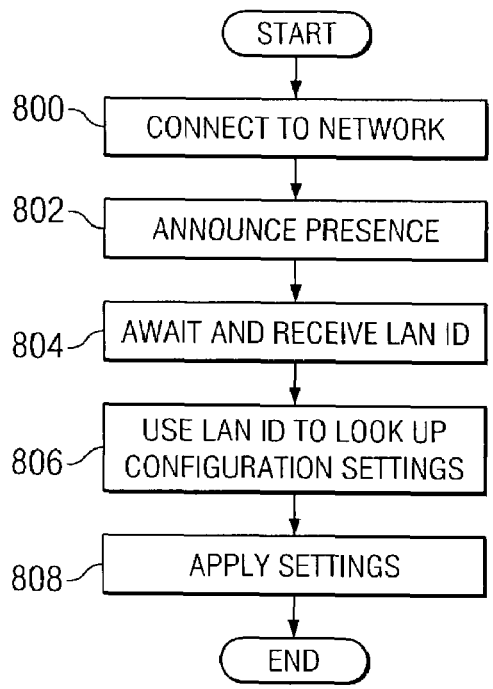
FIG. 8 is a flowchart representation of a process of a client automatically configuring itself for operation with a network in accordance with a preferred embodiment of the present invention.

FIG. 8 is a flowchart representation of a process of configuring a network element in accordance with a preferred embodiment of the present invention. The network element first connects to the network (block 800). The presence of the network element in the network is made known, either as part of the connection process or due to the transmission of data over the network by the network element (block 802). The network element awaits and receives a network identifier (LAN ID) (block 804). The network element then uses that network identifier to look up configuration settings stored on the network element (block 806). Finally, the network element applies those settings to configure itself for operation on the network (block 808).

The client actions represented in FIG. 8 are preferably performed by the client's system software (such as an operating system or device driver), but one of ordinary skill in the art will recognize that the actions described in FIG. 8 may also be performed by a user process or application. It is also contemplated that a combination of system software and user processes or applications may be utilized to perform the actions described in FIG. 8. One of ordinary skill in the art will also recognize that all or part of the actions described in FIG. 8 may be programmed as firmware within the hardware data processing platform of the client or within a network adapter of the client.

Figure 9:
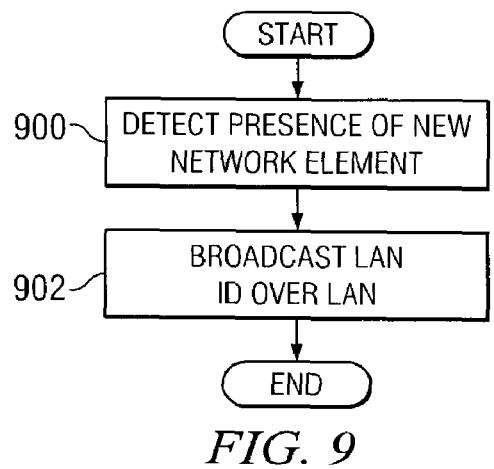
FIG. 9 is a flowchart representation of a process of a server transmitting a network identifier in accordance with a preferred embodiment of the present invention.

FIG. 9 is a flowchart representation of a process of distributing network identifier information by a server in accordance with a preferred embodiment or the present invention. In this preferred embodiment, the server (e.g., a router) detects the presence of a new network element on the network (block 900). The server then broadcasts a network identifier or LAN ID over the network (block 902). One of ordinary skill in the art will recognize that the server actions represented in FIG. 9 may be programmed into system software, user processes or applications, firmware, or a combination thereof, without limitation.

In a preferred embodiment, a feature is provided so that if a client connects to a network and receives the network identifier associated with that network, but does not possess configuration information associated with that identifier, the client's user can enter the needed configuration settings. In this way, configuration settings for this unfamiliar network can be stored for current and future use. This feature may take the form of a dialog box or other message that prompts the user to enter the necessary configuration information corresponding to the network to which the network element has newly become connected.

Figure 10:
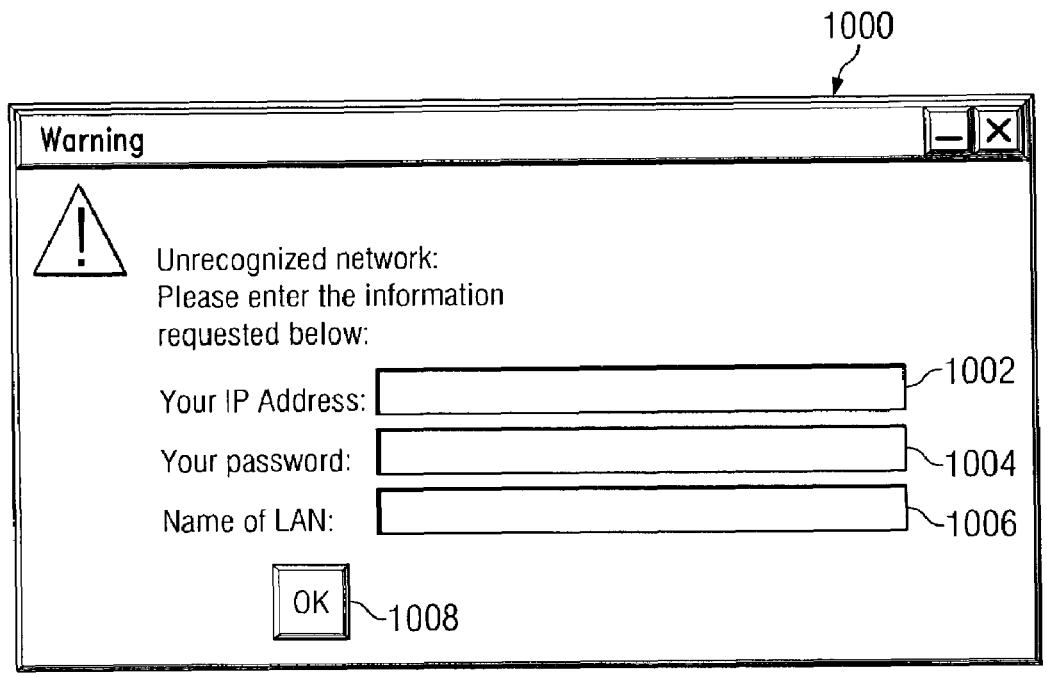
FIG. 10 is a diagram of a dialog box for entering configuration information at a client for a network that is unfamiliar to the client.

FIG. 10 is a diagram of a dialog box 1000 that may be displayed to a user in the event that the users network element has recently connected to an unrecognized network, in accordance with a preferred embodiment of the present invention. Dialog box 1000 is intended to appear on the user's display when an unrecognized identifier is received. In this example, dialog box 1000 contains a number of data entry fields 1002, 1004, and 1006 for entering configuration settings and key attributes.

Data entry fields 1002 and 1004 allow the user to enter the configuration settings of an IP address for the client and a password for accessing the network, respectively. Data entry field 1006 allows the user to enter the alternative key attribute of a name for the network to allow the user to refer to the network by name. An additional "OK" button control 1008 is provided to allow the user to submit the configuration information to software residing on the users network element in order to configure the network element for operation on the network and to store the configuration information for further use when reconnecting to this network.

Figure 11:
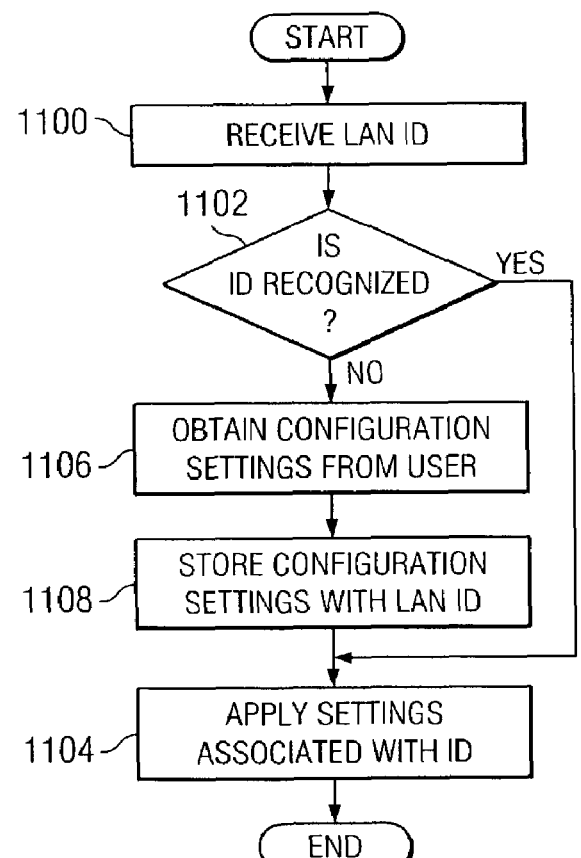
FIG. 11 is a flowchart representation of a process of a client configuring itself in accordance with a preferred embodiment of the present invention implementing a feature for allowing user entry of configuration information for unfamiliar networks.

FIG. 11 is a flowchart representation of a process of obtaining, storing, and applying to configuration settings in a client network element in accordance with a preferred embodiment of the present invention. The identifier or LAN ID for the network is received by the client (block 1100). If the identifier is one that is recognized by the client (i.e., the identifier is one for which configuration settings are stored on the client) (block 1102: yes), then the configuration settings associated with that identifier are applied (block 1104). If the identifier is not recognized (block 1102: no), then the configuration settings for the network are obtained from the user (e.g., using a dialog box as in FIG. 10 or some other form of user prompt) (block 1106). The configuration settings that are obtained from the user are then stored on the client along with the associated identifier for the network (block 1108). Then, the configuration settings that were obtained from the user can then be applied (block 1104). As with FIG. 9, one of ordinary skill in the art will recognize that the actions described in FIG. 11 may be programmed into system software, user processes or application, firmware, or a combination thereof.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system that includes a network device that is coupled to a network, the method comprising:
    connecting a new device to the network, to which the network device is already connected;
    detecting, by the network device, the connection of the new device to the network;
    sending, by the network device, a network identifier that is associated with the network to the new device in response to the network device detecting the connection;
    identifying, by the new device, a set of configuration settings associated with the network identifier; and
    using, by the new device, the set of configuration settings to configure the new device for operation on the network.

2. The method of claim 1, wherein the set of configuration settings is identified from a plurality of sets of configuration settings stored by the new device, and wherein the plurality of sets of configuration settings are indexed by network identifiers associated with each of the plurality of sets of configuration settings.

3. The method of claim 1, wherein the network device is a server, and wherein the network identifier is transmitted over the network by the server.

4. The method of claim 3, wherein the server is a router.

5. The method of claim 3, wherein the server is a general-purpose data processing system.

6. The method of claim 3, wherein the server transmits the network identifier in response to determining that the new device has connected to the network.

7. The method of claim 1, wherein the network identifier is broadcast over the network.

8. The method of claim 7, wherein the network identifier is broadcast over the network at regular intervals.

9. A computer program product, which is stored in a computer-readable medium, in a data processing system that includes a network device that is coupled to a network, said computer program product comprising:

computer usable program code for detecting, by the network device, a connection of a new device to the network, to which the network device is already connected;

computer usable program code for sending, from the network device to the new device, a network identifier that is associated with the network in response to the network device detecting the connection;

computer usable program code for identifying, by the new device, a set of configuration settings associated with the network identifier; and computer usable program code for using, by the new device, the set of configuration settings to configure the new device for operation on the network.

10. The computer program product of claim 9, wherein the set of configuration settings is identified from a plurality of sets of configuration settings stored by the new device, and wherein the plurality of sets of configuration settings are indexed by network identifiers associated with each of the plurality of sets of configuration settings.

11. The computer program product of claim 9, wherein the network device is a server, and wherein the network identifier is transmitted over the network by the server.

12. The computer program product of claim 11, wherein the server is a router.

13. The computer program product of claim 11, wherein the server is a general-purpose data processing system.

14. The computer program product of claim 11, wherein the server transmits the network identifier in response to determining that the new device has connected to the network.

15. The computer program product of claim 9, wherein the network identifier is broadcast over the network.

16. The computer program product of claim 15, wherein the network identifier is broadcast over the network at regular intervals.

17. A data processing system that includes a network device that is coupled to a network, the data processing system comprising:

a new device being connected to a network;

the network device for detecting the connection of the new device to the network, to which the network device is already connected;

the network device for sending a network identifier, which is associated with the network, to the new device in response to the network device detecting the connection;

the new device for identifying a set of configuration settings associated with the network identifier; and the new device for using the set of configuration settings to configure the data processing system for operation on the network.

18. The data processing system of claim 17, wherein the set of configuration settings is identified from a plurality of sets of configuration settings stored by the new device, and wherein the plurality of sets of configuration settings are indexed by network identifiers associated with each of the plurality of sets of configuration settings.

19. The data processing system of claim 17, wherein the network device is a server.

20. The data processing system of claim 19, wherein the server is a router.

21. The data processing system of claim 19, wherein the server is a general-purpose data processing system.

22. The data processing system of claim 19, wherein the server transmits the network identifier in response to determining that the new device has connected to the network.

23. The data processing system of claim 17, wherein the network identifier is broadcast over the network.

24. The data processing system of claim 23, wherein the network identifier is broadcast over the network at regular intervals.

* * * * *